UNITED STATES PATENT OFFICE.

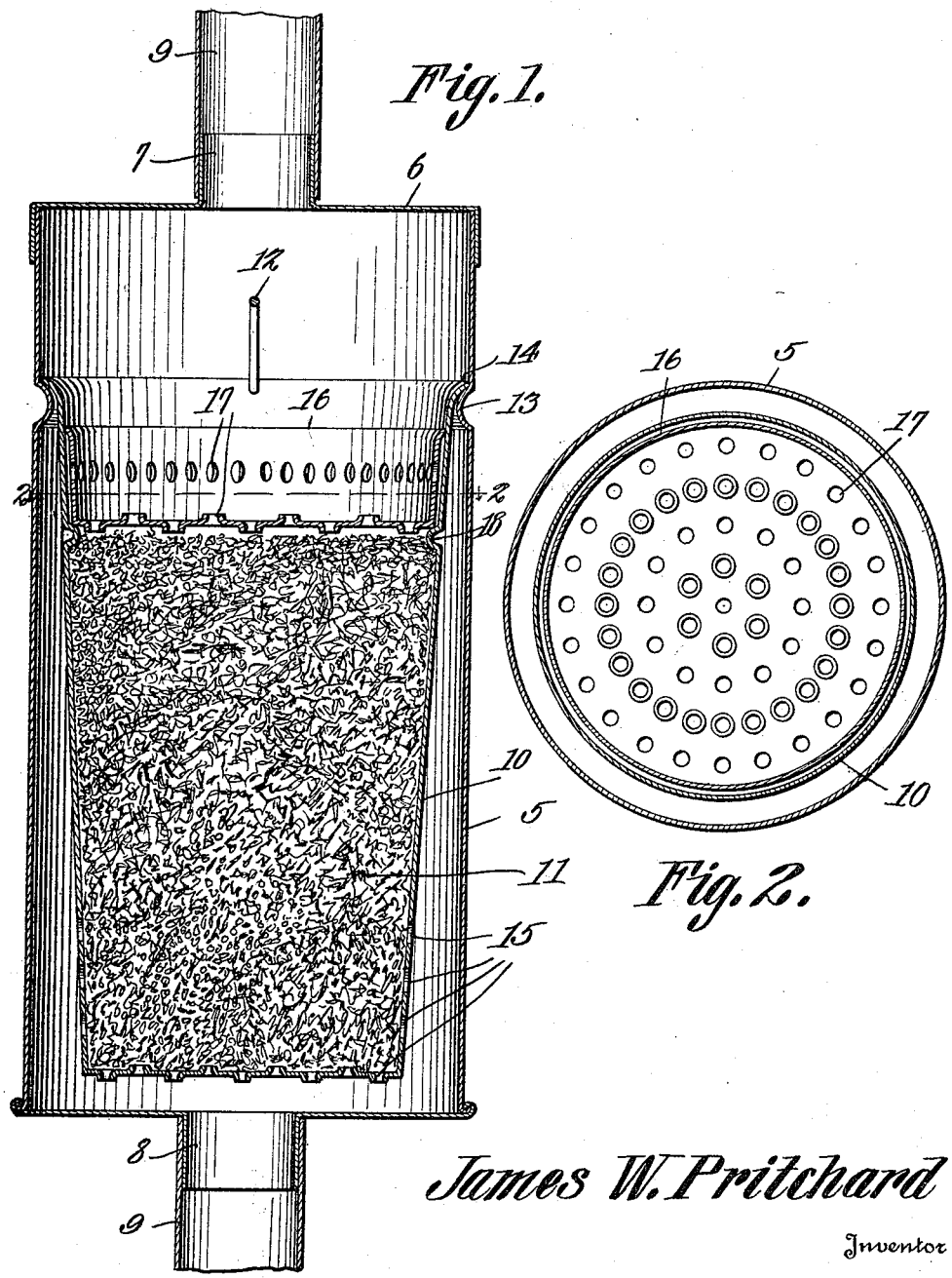

JAMES W. PRITCHARD, OF LA GRANGE, KENTUCKY.

CISTERN STRAINER AND FILTER.

1,230,024.  Specification of Letters Patent.  Patented June 12, 1917.

Application filed October 13, 1916. Serial No. 125,417.

*To all whom it may concern:*

Be it known that I, JAMES W. PRITCHARD, a citizen of the United States, residing at La Grange, in the county of Oldham and State of Kentucky, have invented certain new and useful Improvements in Cistern Strainers and Filters, of which the following is a specification.

The strainer and filter which is the subject matter of the present application for patent is designed more particularly for use in connection with cisterns, and the object of the invention is to provide a device of this kind which is non-freezing, and which can be easily cleaned, and also to provide a structure which is simple and easily assembled.

With the objects stated in view, the invention consists in a novel combination and arrangement of parts to be hereinafter described and claimed, and in order that the same may be better understood, reference is had to the accompanying drawing.

In the drawing, Figure 1 is a central vertical section of the device, and Fig. 2 is a horizontal section on the line 2—2 of Fig. 1.

Referring specifically to the drawing, the main body of the device is an upright cylindrical casing 5 closed at the bottom and having its top provided with a removable cover 6 having a short section 7 of downspout, the latter being the water inlet. The casing bottom has a short section 8 of downspout, which latter is the water outlet. The casing is interposed in the downspout 9 leading to the cistern, and it is connected thereto by slip joints at 7 and 8. The cistern has not been illustrated as it forms no part of the present invention.

In the casing 5 is removably mounted a cylindrical receptacle or holder 10 for the charcoal or other filtering material 11. This receptacle is in the form of a pail or can open at the top and having thereat a bail 12 to facilitate removal when it needs cleaning. A short distance below the top of the casing, the latter has an internal circumferential bead 13 on which the holder is hung, the latter having at the top a flare or bead 14 which seats on the bead 13. The holder tapers downward, so that it is spaced from the side of the casing 5, and its lower end is located a short distance above the bottom of the casing, so that the outlet 8 is left unobstructed. In the bottom and side of the holder adjacent to the bottom, are perforations 15 through which the water escapes into the casing after passing through the filtering material 11.

In the top of the holder 10 is removably mounted a shallow tray 16 having perforations 17 in its side and bottom. This tray seats on an internal circumferential bead 18 in the holder, near the top thereof.

In use, the water entering the casing 5 through the inlet 7 drops on the tray 16, and passes through the perforations 17 thereof into the holder 10, and after passing through the filtering material 11, the water escapes through the perforations 15 into the casing and discharges from the latter through the outlet. The purpose of the tray 16 is to catch large objects such as leaves, etc.

It will be seen that the parts are all readily accessible and removable, and the device can therefore be easily kept clean. The device is also non-freezing, as all the water can drain out.

The parts can be cheaply made out of sheet metal, and the bottom ones of the perforations 15 and 17 may be made by punching, the perforations being punched alternately inward and outward. This manner of forming the perforations renders the same less liable to clogging.

While the preferred embodiment of the invention has been illustrated and described, it will be understood that various changes and modifications in the structural details may be made without a departure from the spirit and scope of the invention as claimed hereinafter.

I claim:

A cistern strainer and filter, comprising a casing having a top inlet and a bottom outlet, and provided at the top with an internal circumferential bead, a filtering material holder in the casing, said holder seating removably on the aforesaid bead and having bottom outlet perforations, and a perforated tray mounted in the top of the holder, said holder having an internal circumferential bead on which the tray removably seats.

In testimony whereof I affix my signature in the presence of two witnesses.

JAMES W. PRITCHARD.

Witnesses:
GEO. E. SCHUMAN,
ALEXANDER C. SCHUMAN.

Copies of this patent may be obtained for five cents each, by addressing the "Commissioner of Patents, Washington, D. C."